(12) United States Patent
Yoo

(10) Patent No.: US 6,185,362 B1
(45) Date of Patent: Feb. 6, 2001

(54) DIGITAL CAMCORDER WITH AUTOMATIC SELECT FUNCTION OF AUDIO SIGNAL OUTPUT CHANNELS AND RECORDING/REPRODUCING METHOD OF AUDIO SIGNALS

(75) Inventor: Hang-du Yoo, Suwon (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 08/961,766

(22) Filed: Oct. 31, 1997

(30) Foreign Application Priority Data

Jan. 30, 1997 (KR) .................................................. 97-2875

(51) Int. Cl.[7] .............................. H04N 5/16; H04N 5/225
(52) U.S. Cl. ........................ 386/54; 386/107; 386/117; 348/220
(58) Field of Search ................... 386/4, 38, 39, 386/54, 64, 98, 107, 117, 95, 94, 96; 360/15–17; 358/906, 909.1; 348/220, 231, 233

(56) References Cited

U.S. PATENT DOCUMENTS

| | | | |
|---|---|---|---|
| 4,858,012 | * 8/1989 | Hino et al. | 358/210 |
| 5,124,814 | * 6/1992 | Takahashi et al. | 358/906 |
| 5,499,106 | * 3/1996 | Arano et al. | 358/343 |
| 6,009,233 | * 12/1999 | Tsujimura et al. | 386/95 |

FOREIGN PATENT DOCUMENTS

| | | | |
|---|---|---|---|
| 4-79071 | 3/1992 | (JP) | G11B/20/00 |
| 4-128479 | 11/1992 | (JP) | H04N/5/91 |
| 5-2833 | 1/1993 | (JP) | G11B/20/12 |
| 6-162675 | 6/1994 | (JP) | G11B/20/12 |

\* cited by examiner

*Primary Examiner*—Thai Tran
(74) *Attorney, Agent, or Firm*—Sughrue, Mion, Zinn, Macpeak & Seas, PLLC

(57) ABSTRACT

A digital camcorder having a function of automatically choosing an audio signal output channel. The digital camcorder includes an operating portion, an audio input/output portion, a channel select portion, an error correction coding/decoding portion, and a controlling portion. The operating portion applies an operation command of a playback or a shooting/dubbing mode. The audio input/output portion inputs/outputs the audio signals. The channel select portion selects a channel for recording audio signals input during recording and a channel for outputting the audio signals during playback. The error correction coding/decoding portion inserts a dubbing flag according to a dubbing flag inserting command during recording, and detects the dubbing flag according to a dubbing flag detection command during playback. The controlling portion applies the dubbing flag insert command to the error correction coding/decoding portion during the dubbing mode during recording, and applies the dubbing flag detection command to the error correction coding/decoding portion during playback, according to an operational command applied from the operating portion, thereby controlling the channel select portion according to the existence of the dubbing flag.

14 Claims, 5 Drawing Sheets

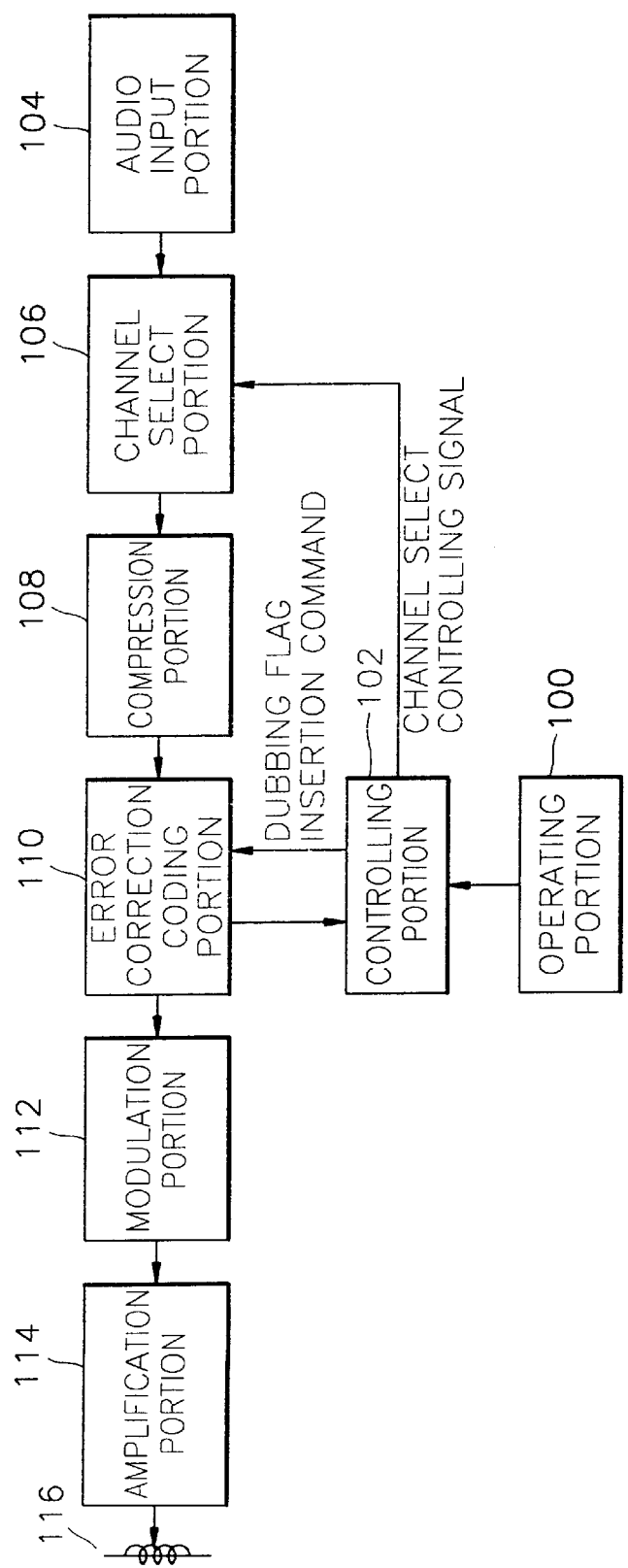

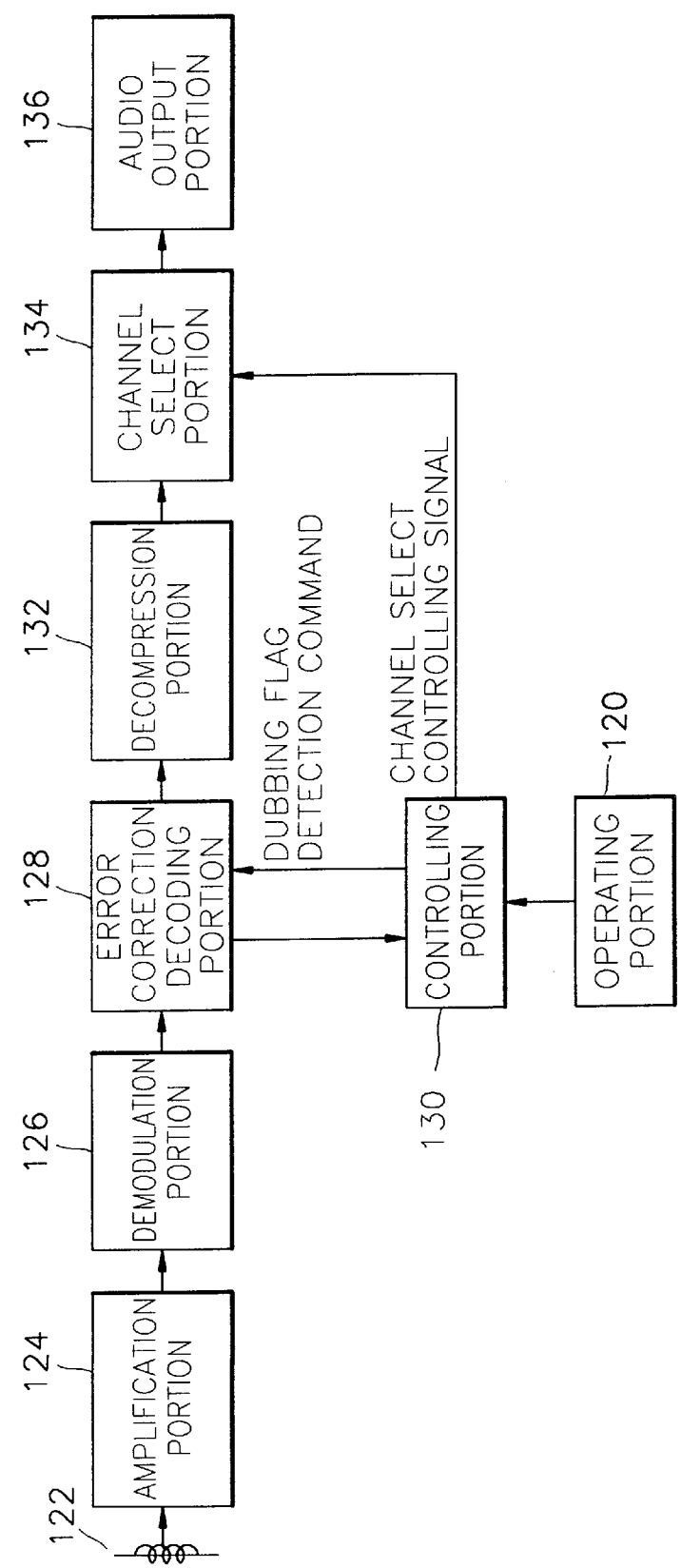

TIME →

DIGITAL CAMCORDER WITH AUTOMATIC SELECT FUNCTION OF AUDIO SIGNAL OUTPUT CHANNELS AND RECORDING/ REPRODUCING METHOD OF AUDIO SIGNALS

BACKGROUND OF THE INVENTION

The present invention relates to a digital camcorder, and more specifically, to a digital camcorder which has an automatic select function for selecting an audio signal output channel. The present invention also relates to a recording/reproducing method of the audio signals. In the recording/reproducing method, a dubbing flag is inserted into a sub-code during a dubbing mode, and the sub-code is read during a playback mode, with a result that the audio signals of a sub-channel are automatically selected and output if a dubbing flag is detected, and the audio signals of a main channel are selected and output when there are no dubbing flags detected. The present invention is based on Korean Application No. 97-2875, which is incorporated herein by reference.

In digital and analog camcorders, audio signals may be recorded on a recording media during a shooting mode and during a dubbing mode. During the shooting mode, video signals are shot and audio signals in the shooting area are recorded at the same time. During the dubbing mode, audio signals, in addition to the audio signals recorded during the shooting mode, are artificially recorded.

There are differences between the tape-recording methods of analog and digital camcorders. That is, in analog camcorders, the audio signals of the shooting scenes are recorded in the audio channel on a recording tape during the shooting mode, and then these audio signals are erased and other audio signals are recorded in the audio channel during the dubbing mode. However, in digital camcorders, there is a main audio channel and a separate sub-audio channel. The main audio channel is the recording channel of the audio signals on the shooting scenes, and the sub-audio channel is the recording channel for additional audio signals such as background music.

Conventional digital camcorders have a disadvantage in that users must manually choose the channels. Moreover, users cannot easily find the exact timing when users play back the audio signals of the main channel recorded when photographing or those of the sub-channel recorded when dubbing, or when users play back the audio signals of the main and sub-channel simultaneously.

SUMMARY OF THE INVENTION

To solve the above problems of the conventional digital camcorders, it is an object of the present invention to provide a digital camcorder which has an automatic select function for automatically selecting an audio signal output channel. After dubbing flags are inserted to a sub-code area during a dubbing mode and the sub-codes are read during a playback mode, the audio signals of a sub-channel are chosen when there are dubbing flags, and the audio signals of a main channel are chosen when there are no dubbing flags.

It is another object of the present invention to provide an audio signal recording method.

It is still another object of the present invention to provide an audio signal playback method.

In order to accomplish the first object of the present invention, there is provided a digital camcorder having an audio signal output channel which records audio signals on shooting scenes and dubs audio signals respectively in a main channel and a sub-channel according to a shooting mode or a dubbing mode during recording, and outputs the audio signals recorded in the main channel and the sub-channel during playback, the digital camcorder comprising an operating portion for applying an operation command of the playback mode or the shooting/dubbing mode; an audio input/output portion for inputting/outputting the audio signals; a channel select portion for selecting a channel for recording audio signals input during recording and a channel for outputting the audio signals during playback; an error correction coding/decoding portion for inserting a dubbing flag according to a dubbing flag insertion command during recording and for detecting the dubbing flag according to a dubbing flag detection command during playback; and a controlling portion for applying the dubbing flag insertion command to the error correction coding/decoding portion during the dubbing mode during recording and for applying the dubbing flag detection command to the error correction coding/decoding portion during playback, according to an operational command supplied by the operating portion, thereby controlling the channel select portion according to the existence of the dubbing flag detected.

Preferably, the dubbing flag is inserted in a sub-code area of a recording tape when the audio signals are recorded in the sub-channel.

Preferably, the controlling portion controls the audio signals recorded in the sub-channel to be output when the dubbing flag is detected during playback and controls the audio signals recorded in the main channel to be output when the dubbing flag is not detected.

To achieve the second object, there is provided method of recording audio signals in a digital camcorder, comprising the steps of (a) determining whether a set recording mode is a dubbing mode or a shooting mode; (b) inserting a dubbing flag and recording the audio signals in a sub-channel if the set recording mode is determined in step (a) to be the dubbing mode; (c) recording the audio signals in the main channel if the set recording mode is determined in the step (a) to be a shooting mode; (d) determining whether the recording is finished; and (e) returning to the step (a) if the recording is not finished, and ending the method if the recording is finished.

To achieve the third object, there is provided a method of playing back audio signals recorded in each channel in a digital camcorder, comprising the steps of (a) determining whether a dubbing flag is detected during playback; (b) outputting audio signals of a sub-channel when the dubbing flag is detected in the step (a) and audio signals of a main channel when the dubbing flag is not detected in the step (a); (c) determining whether the playback is finished; and (d) returning to the step (a) if the playback is not finished, and ending the method if the playback is finished.

BRIEF DESCRIPTION OF THE DRAWINGS

The above objects and advantages of the present invention will become more apparent by describing in detail a preferred embodiment thereof with reference to the attached drawings in which:

FIG. 1 is a block diagram illustrating a recording apparatus for recording audio signals in a digital camcorder which has an automatic select function for selecting an audio signal output channel according to the present invention;

FIG. 2 is a block diagram illustrating a reproducing apparatus for reproducing audio signals in a digital camcorder which has an automatic select function for selecting an audio signal output channel according to the present invention;

FIGS. 3A–3C are views illustrating how the audio signals are recorded in and played back from a main channel and a sub-channel, in which FIG. 3A illustrates the main channel in which the audio signals are recorded during the shooting mode, FIG. 3B illustrates the sub-channel in which the audio signals are recorded during the dubbing mode, and FIG. 3C illustrates the forms of the audio signals which are output during the playback mode of the digital camcorder according to the present invention;

DETAILED DESCRIPTION OF THE INVENTION

Figure 3A:
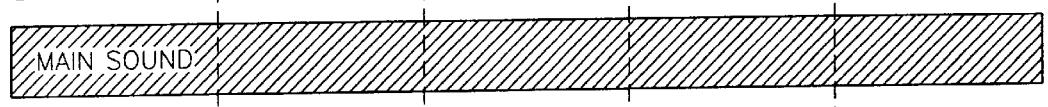

The audio signal recording apparatus illustrated in FIG. 1 includes an operating portion 100, a controlling portion 102, an audio input portion 104, a channel select portion 106, a compression portion 108, an error correction coding portion 110, a modulation portion 112, an amplification portion 114, and a recording head 116.

The controlling portion 102 provides a controlling signal for selecting a predetermined audio channel and outputs a dubbing flag insertion command for inserting a dubbing flag during a dubbing mode. The controlling signal is based on a recording mode operation signal which is received from the operating portion 100 and indicates whether to select a shooting mode or a dubbing mode.

The channel select portion 106 selects, according to a predetermined controlling signal provided by the controlling portion 102, a sub-channel when the audio signals are input during the dubbing mode and selects a main channel when the audio signals are input during the shooting mode.

The compression portion 108 compresses the audio signals of the channel selected by the channel select portion 106.

The error correction coding portion 110 produces an error correction code after correcting the errors in the data compressed by the compression portion 108, and inserts a dubbing flag according to the dubbing flag insertion commands provided by the controlling portion 102.

The modulation portion 112 modulates the data error-corrected by the error correction coding portion 110.

The amplification portion 114 amplifies the modulated signals output by the modulation portion 112 to a predetermined level.

The recording head 116 records the amplified signals on a recording tape under the control of the amplification portion 114.

FIG. 2 is a view illustrating an audio signal playback apparatus in a digital camcorder which has the automatic select function of the audio signal output channel according to the present invention.

The audio signal playback apparatus illustrated in FIG. 2 includes an operating portion 120, a playback head 122, an amplification portion 124, a demodulation portion 126, an error correction decoding portion 128, a controlling portion 130, a decompression portion 132, a channel select portion 134 and an audio output portion 136.

The amplification portion 124 amplifies the audio signals of the main channel and the sub-channel read through the playback head 122 to a predetermined level when a playback operation command is output by the operating portion 120.

The demodulation portion 126 demodulates the signals which are output by the amplification portion 124.

The error correction decoding portion 128 receives the signals output from the demodulation portion 126, corrects the errors in the received signals, and detects whether a dubbing flag exists in the received signals.

The controlling portion 130 applies a dubbing flag detecting command to the error correction decoding portion 128, receives information from the error correction decoding portion 128 regarding whether the dubbing flag exists, and outputs a controlling signal for selecting the sub-channel only if a dubbing flag exists.

The decompression portion 132 restores the compression of the error corrected signals received from the error correction decoding portion 128.

The channel select portion 134 selects a predetermined channel among the audio signals that are output by the decompression portion 132 according to the controlling signal which is output by the controlling portion 130.

The audio output portion 136 outputs the audio signals that are output via the channel selected by the channel select portion 134.

Figure 3B:
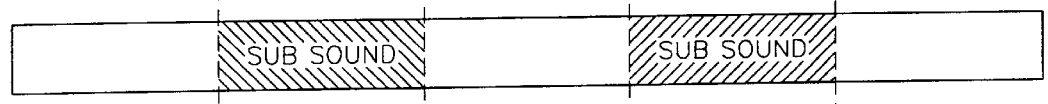
Figure 3C:
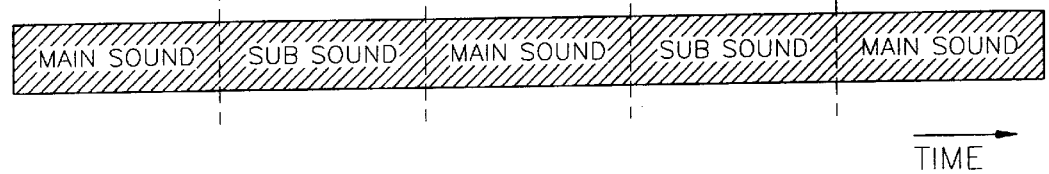

FIGS. 3A through 3C are views illustrating how the audio signals are recorded/played back in a main channel and a sub-channel during recording/playback. FIG. 3A illustrates the main channel in which the audio signals are recorded during the shooting mode. FIG. 3B illustrates the sub-channel in which the audio signals are recorded during the dubbing mode. FIG. 3C illustrates the form of the audio signals which are output during the playback mode of the digital camcorder according to the present invention.

Figure 4:
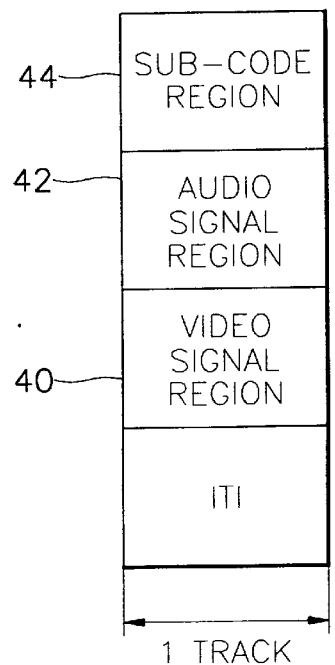
FIG. 4 is a view illustrating the structure of one track in which the data of the digital camcorder are recorded.

FIG. 4 is a view illustrating the structure of one track in which the data is recorded in the digital camcorder. Information which is stored in one track is divided into a video signal region 40, an audio signal region 42 and a sub-code region 44. In the sub-code region 44, application information such as the time of a current track, the track information, the dubbing flags and so on is stored. The audio signal region 42 includes the main channel in which the audio signals are recorded during shooting and the sub-channel in which the audio signals are recorded during dubbing.

The recording and playback operations in the digital camcorder illustrated in FIGS. 1 and 2 will be described with reference to FIGS. 3A, 3B, 3C and 4.

First, in the recording operation, if a predetermined command, that is, a shooting or dubbing command is applied from an operating portion 100, the controlling portion 102 outputs the controlling signal for selecting a channel and applies a command for inserting a dubbing flag only in the case that the dubbing command is applied.

The channel select portion 106 selects the main channel or the sub-channel according to the controlling signals input from the controlling portion 102 and outputs the signals input from the audio input portion 104. In the compression portion 108, the audio signals stored in the channel selected by the channel select portion 106 are compressed. In the error correction coding portion 110, an error correction code of the audio signals output from the compression portion 108 is produced. When a dubbing flag insertion command from the controlling portion 102 is applied to the error correction coding portion 110, a dubbing flag is inserted.

That is, dubbing flag information is inserted in the sub-code region 44, illustrated in FIG. 4.

In the modulation portion 112, the audio signals output from the error correction coding portion 110 are modulated. In the amplification portion 114, the modulated audio signals are amplified to a predetermined level and the audio signals are recorded on a recording tape by the recording head 116. That is, the audio signals input during the shooting mode are recorded in the main channel and the audio signals input during the dubbing mode are recorded in the sub-channel, as illustrated in FIGS. 3A and 3B.

In addition, when a playback operation of the tape recorded as described above is performed, the audio signals of the main channel and the sub-channel, which are read from the tape by the playback head 122, are amplified to a predetermined level by the amplification portion 124. The amplified audio signals are demodulated by the demodulation portion 126. The demodulated signals are error-corrected by the error correction decoding portion 128. Here, the error correction decoding portion 128 detects whether a dubbing flag exists. If a dubbing flag exists, the controlling signal is output from the controlling portion 130. At this time, the channel select portion 134, which receives the audio signals stored in each channel decompressed by the decompression portion 132, outputs only the audio signals of the channel selected by the controlling signal output from the controlling portion 130 to the audio output portion 136. That is, when the audio signals of the main channel are output according to the channel select signal output from the controlling portion 130, the audio signals recorded in the sub-channel are output by automatically selecting the sub-channel if the dubbing flag is detected, and then if no dubbing flag is detected, the audio signals of the main channel are output again.

Figure 5:
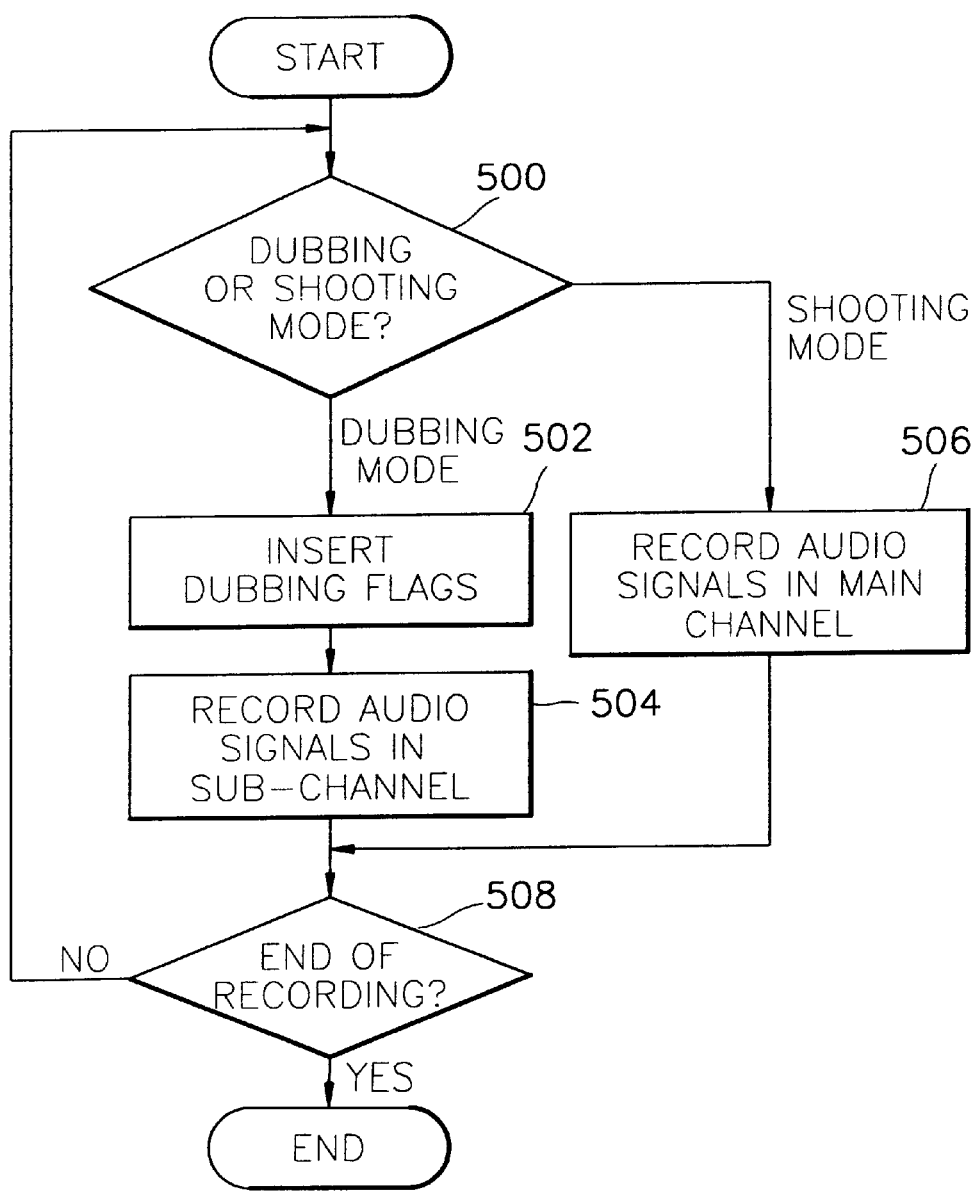
FIG. 5 is a flowchart of the method of recording the audio signals according to the present invention.

FIG. 5 is a flowchart of the method of recording the audio signals in the digital camcorder according to the present invention.

It is determined whether the recording mode is a dubbing or shooting mode (step 500).

In the result of the determination in step 500, if the mode is a dubbing mode, a dubbing flag is inserted (step 502) and the audio signals are recorded in the sub-channel (step 504). On the other hand, if the mode is a shooting mode, the audio signals are recorded in the main channel (step 506).

In the result of determining whether the recording is finished (step 508), the program will return to the determination step (step 500) if the recording is not finished, and the program ends if the recording is finished.

Figure 6:
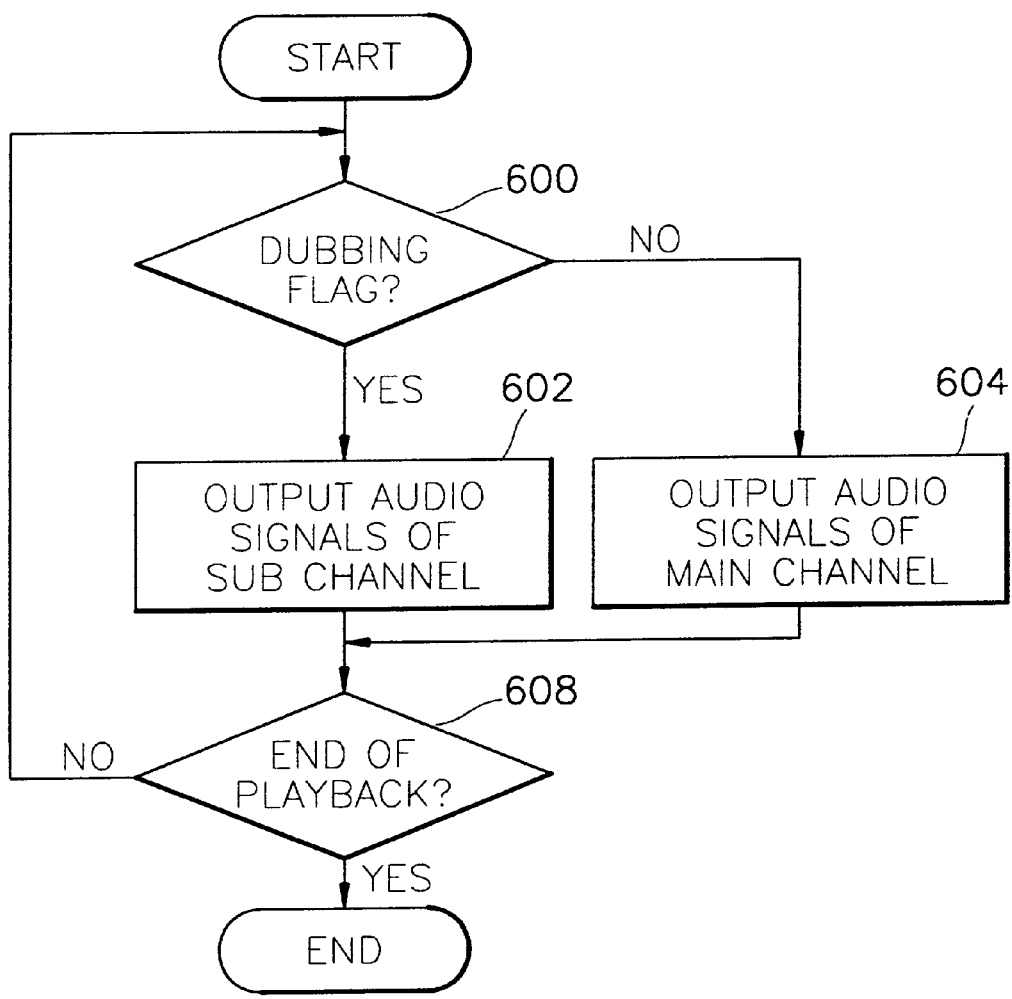
FIG. 6 is a flowchart of the method of playing back the audio signals according to the present invention.

FIG. 6 is a flowchart of the method of playing back the audio signals recorded in each channel in the digital camcorder according to the present invention.

During playback, it is determined whether the dubbing flags are detected (step 600).

In the determination result of step 600, the audio signals of the sub-channel are output if the dubbing flag is detected, and the audio signals of the main channel are output if the dubbing flag is not detected (step 604).

In the result of the playback operation (step 608), the program returns to step 600 if the playback is not finished, and the program ends if the playback is finished.

As described above, in the digital camcorder which has the automatic select function of the audio output channel and the corresponding recording/reproducing method according to the present invention, the dubbing flag is inserted during the dubbing mode during recording and the dubbing flag is detected during playback. Then, the output audio signals are automatically selected by means of the choice of the main channel and the sub-channel depending on the result of whether or not dubbing flags exist. Thus, this digital camcorder provides simplicity of operation in comparison with the conventional digital camcorder.

While only certain embodiments of the invention have been specifically described herein, it will apparent that numerous modifications may be made thereto without departing from the spirit and scope of the invention.

What is claimed is:

1. A digital camcorder having an audio signal output channel which records audio signals on shooting scenes and dubs audio signals respectively in a main channel and a sub-channel according to a shooting mode or a dubbing mode during recording, and outputs the audio signals recorded in the main channel and the sub-channel during playback, the digital camcorder comprising:

an operating portion for applying an operation command of the playback mode or the shooting/dubbing mode;

an audio input/output portion for inputting/outputting the audio signals;

a channel select portion for selecting a channel for recording audio signals input during recording and a channel for outputting the audio signals during playback;

an error correction coding/decoding portion for inserting a dubbing flag according to a dubbing flag insertion command during recording and for detecting the dubbing flag according to a dubbing flag detection command during playback; and a controlling portion for applying the dubbing flag insertion command to the error correction coding/decoding portion during the dubbing mode during recording and for applying the dubbing flag detection command to the error correction coding/decoding portion during playback, according to an operational command supplied by the operating portion, thereby controlling the channel select portion according to the existence of the dubbing flag detected.

2. A digital camcorder according to claim 1, wherein the dubbing flag is inserted in a sub-code area of a recording tape when the audio signals are recorded in the sub-channel.

3. A digital camcorder according to claim 1, wherein the controlling portion controls the audio signals recorded in the sub-channel to be output when the dubbing flag is detected during playback and controls the audio signals recorded in the main channel to be output when the dubbing flag is not detected.

4. A digital camcorder having an audio signal output channel which records audio signals of shooting scenes and dubs audio signals in a main channel and a sub-channel, respectively, according to a shooting mode or a dubbing mode, the digital camcorder comprising:

an operating portion for applying an operation command of a shooting/dubbing mode;

an audio input portion for inputting the audio signals;

a channel select portion for selecting a channel for recording the input audio signals;

an error correction coding portion for inserting a dubbing flag according to a dubbing flag insertion command; and a controlling portion for applying the dubbing flag insertion command to the error correction coding portion during the dubbing mode, according to an operational command supplied by the operating portion.

5. A digital camcorder according to claim 4, further comprising a compression portion for compressing the audio signals of the channel selected by the channel select portion.

6. A digital camcorder according to claim 4, further comprising a modulation portion for modulating data received from the error correction coding portion.

7. A digital camcorder according to claim 4, further comprising an amplification portion for amplifying the modulated signals from the modulation portion to a predetermined level.

8. A digital camcorder having an audio signal output channel which outputs audio signals recorded in a main channel and a sub-channel, the digital camcorder comprising:

- an operating portion for applying an operation command of the playback mode;
- an audio output portion for outputting the audio signals;
- a channel select portion for selecting a channel for outputting the audio signals;
- an error correction decoding portion for detecting a dubbing flag according to a dubbing flag detection command; and
- a controlling portion for applying the dubbing flag detection command to the error correction decoding portion, according to an operational command supplied by the operating portion, thereby controlling the channel select portion according to the existence of the dubbing flag detected.

9. A digital camcorder according to claim 8, further comprising a decompression portion for restoring a compression of the signals from the error correction decoding portion.

10. A digital camcorder according to claim 8, further comprising an amplification portion for amplifying the audio signals of the main channel and the sub-channel to a predetermined level.

11. A digital camcorder according to claim 10, further comprising a demodulation portion for demodulating the amplified audio signals.

12. A method of recording audio signals in a digital camcorder, comprising the steps of:

(a) determining whether a set recording mode is a dubbing mode or a shooting mode;

(b) inserting a dubbing flag and recording the audio signals in a sub-channel if the set recording mode is determined in step (a) to be the dubbing mode;

(c) recording the audio signals in the main channel if the set recording mode is determined in the step (a) to be a shooting mode;

(d) determining whether the recording is finished; and (e) returning to the step (a) if the recording is not finished, and ending the method if the recording is finished.

13. A method of playing back audio signals recorded in each channel in a digital camcorder, comprising the steps of:

(a) determining whether a dubbing flag is detected during playback;

(b) outputting audio signals of a sub-channel when the dubbing flag is detected in the step (a) and audio signals of a main channel when the dubbing flag is not detected in the step (a);

(c) determining whether the playback is finished; and (d) returning to the step (a) if the playback is not finished, and ending the method if the playback is finished.

14. A method of recording audio signals in a digital camcorder, comprising the steps of:

(a) determining whether a set recording mode is a dubbing mode or a shooting mode;

(b) inserting a dubbing flag and recording the audio signals, which are transformable into audio sounds, in a sub-channel if the set recording mode is determined in step (a) to be the dubbing mode;

(c) recording the audio signals, which are transformable into audio sounds, in the main channel if the set recording mode is determined in the step (a) to be a shooting mode;

(d) determining whether the recording is finished; and (e) returning to the step (a) if the recording is not finished, and ending the method if the recording is finished.

\* \* \* \* \*